May 31, 1938. E. F. ZAPARKA 2,119,305
SIMPLIFIED FLAP OPERATING MEANS
Original Filed June 12, 1933 4 Sheets-Sheet 3

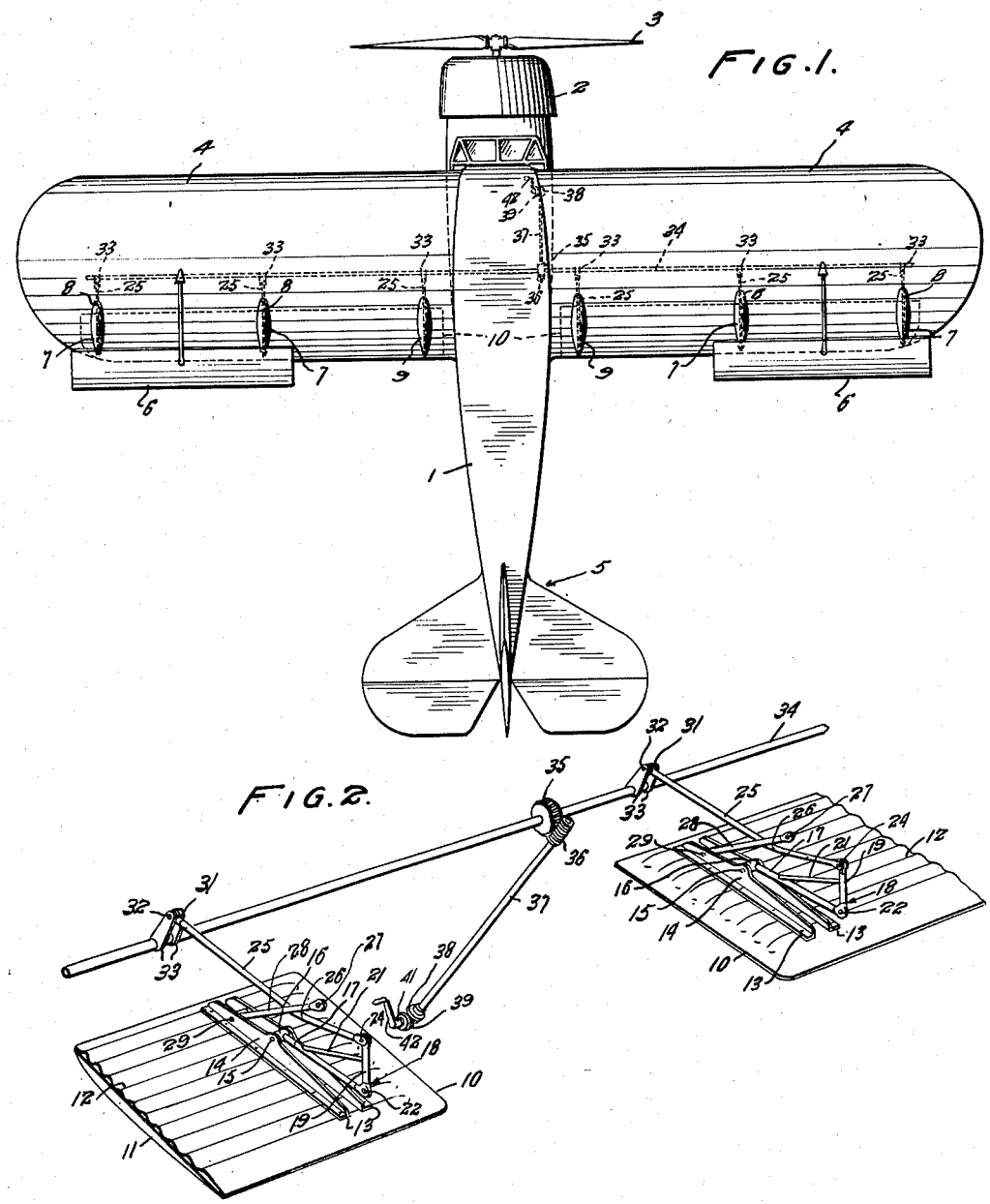

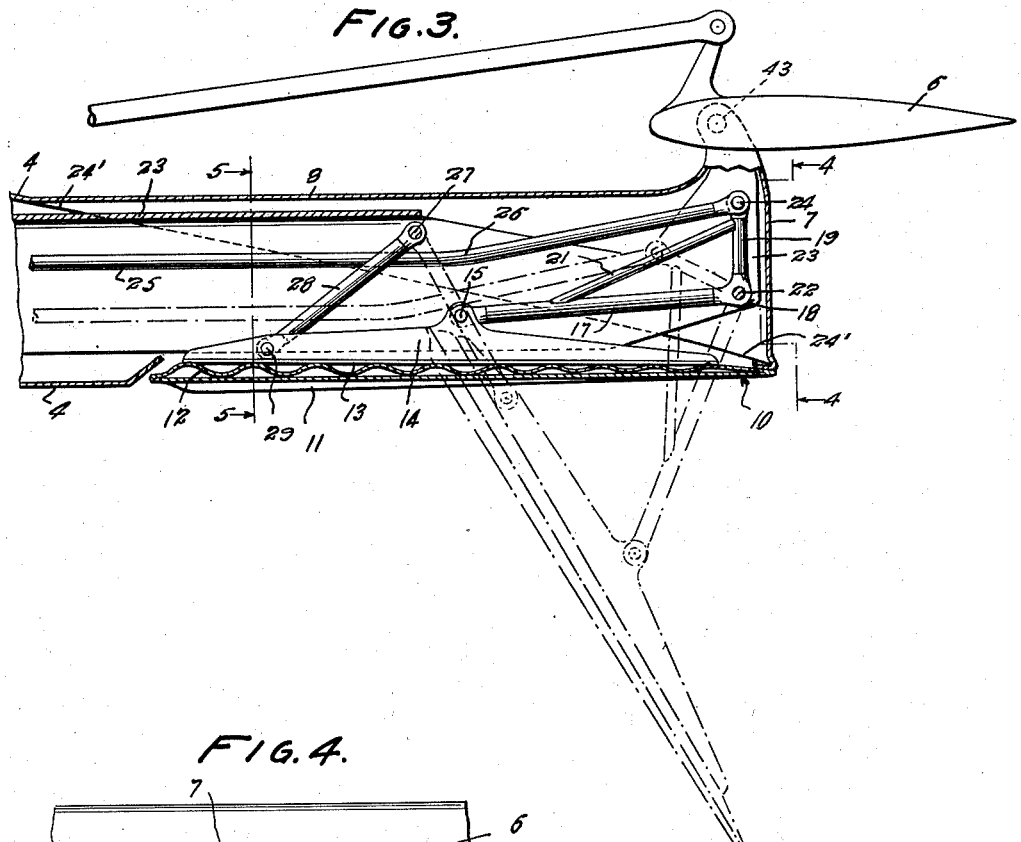
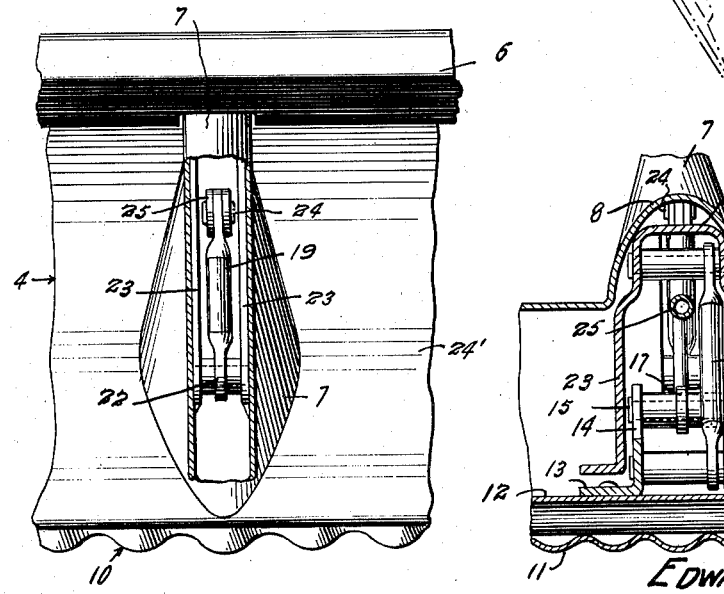
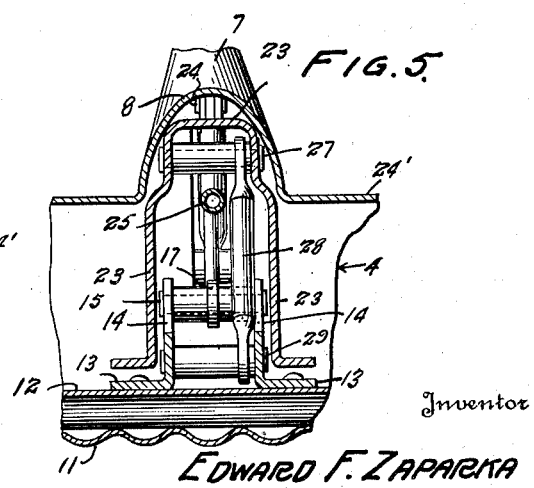

Inventor
EDWARD F. ZAPARKA
By Semmes & Semmes
Attorneys

Patented May 31, 1938

2,119,305

UNITED STATES PATENT OFFICE 2,119,305

SIMPLIFIED FLAP OPERATING MEANS

Edward F. Zaparka, Baltimore, Md., assignor to Zap Development Corporation, Baltimore, Md., a corporation of Delaware Application June 12, 1933, Serial No. 675,486
Renewed December 19, 1936

18 Claims. (Cl. 244—42)

My invention relates to means for operating wing flaps, and particularly relates to mechanisms for supporting the wing flap in its positions of extension and retraction.

In wing flaps of the Zap type whether used on airplane wings or control surfaces, it is desirable that the trailing edge of the flap in positions of extension and retraction shall lie substantially directly below the trailing edge of the airfoil to which they are ancillary. Another way of stating this is that the trailing edge of the flap in its various positions of extension shall lie within the locus of perpendiculars drawn to the datum lines of the airfoil sections which pass through the trailing edge of the airfoil.

An object of my invention is to provide a flap supporting and operating means which is sturdy in construction and easy of repair and replacement.

Another object of my invention is to provide a flap supporting and operating means which will permit the trailing edge of the flap to lie substantially in the locus of perpendiculars drawn to the datum lines of the airfoil sections which pass through the trailing edge of the airfoil.

A further object of my invention is to provide wing flaps which are positive in operation and have few operating parts, and in which the mechanisms for supporting and operating the flaps lie largely without the airstream passing over the surface of the airfoil.

In the drawings:

Figure 1 is a top plan view of an airplane equipped with wing flaps and Zap ailerons;

Fig. 2 is a detail view in perspective showing the flap operating mechanism mounted on the plane indicated in Figure 1;

Fig. 3 is a detail view in side elevation of a portion of the flap operating mechanism;

Fig. 4 is a sectional view taken along the line 4—4 of Figure 3, looking in the direction of the arrows;

Fig. 5 is a sectional view taken along the line 5—5 of Figure 3, looking in the direction of the arrows;

Figures 6, 7, 8:
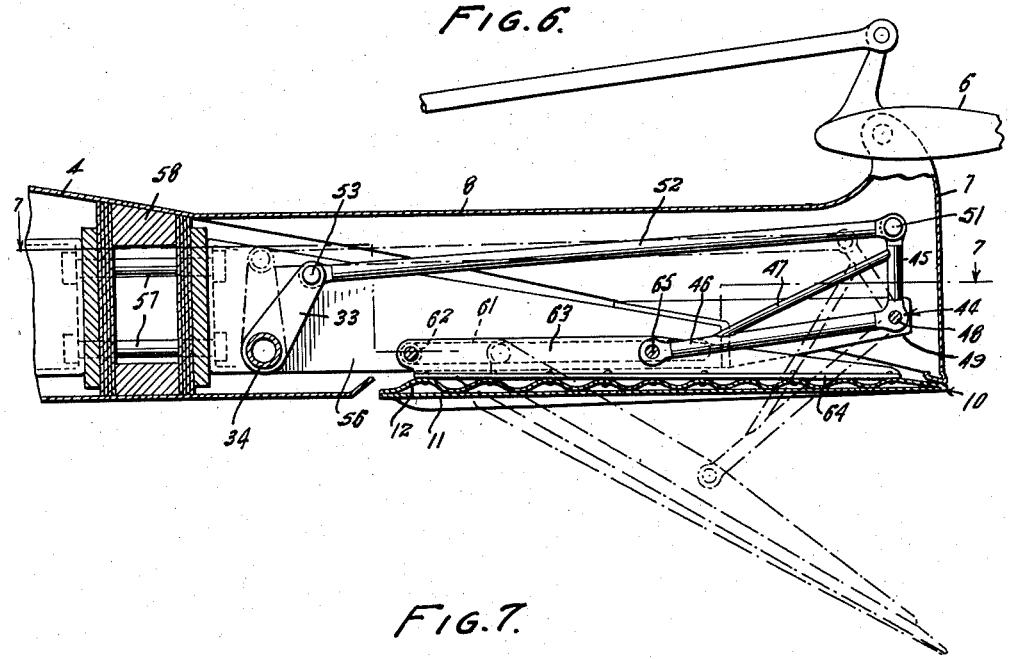
Fig. 6 is a sectional view showing a portion of the operating mechanism of another type.
Fig. 7 is a view taken along the line 7—7 of Figure 6, looking in the direction of the arrows.
Fig. 8 is a view in side elevation which is somewhat schematic, and shows another type of flap operating mechanism.

Referring to the drawings, I have shown an airplane having a fuselage 1, motor 2, a propeller 3 and wings 4. The empennage surfaces, comprising rudder, stabilizer and elevator surfaces, I have designated generally by the numeral 5.

Mounted above the trailing edge of the wings 4 are ailerons of the Zap type which I have designated by the numeral 6. These are supported on stream-lined aileron horns 7 which are forwardly extended, as indicated at 8, to provide room for housing operating parts for the wing flap.

I have also shown in Figure 1 streamlined housings 9 for the flap operating parts. These streamlined housings 9 house the operating parts for the flaps at the stations most adjacent to the fuselage 1. It may not always be necessary to have such housings 9, as the ailerons 6 may be made long enough so that the aileron horns 7 will serve entirely to house all of the operating mechanism for the flaps at all of the stations along the wing. The housings 9 are substantially of the shape indicated by the aileron horns 7 with their forward extensions 8. In the case of the housings 9 the construction will not be extended to any marked degree above the level of the upper surface 8. It will be noted that in Figure 3, because the aileron horn 7 supports an aileron, it is necessary to extend the aileron horn well above the upper surface 8 of the forward extension.

The wing flaps I have designated by the numeral 10. They comprise a smooth lower surface 11 and a corrugated upper surface 12. On the corrugated upper surface 12 I have provided supports 13 which are suitably riveted or otherwise attached to the upper corrugated surface 12 of the flaps 10.

These supports 13 are provided with upwardly extending flanges 14 in which are journaled stub shafts 15. The stub shafts 15 are surrounded by collars 16 to which are attached arms 17 of bell crank levers 18. The bell crank levers 18 have other arms 19, and there are bracing members 21 which brace the bell crank construction and give it desirable rigidity with lightness. The bell crank levers are pivoted to pivots 22 which are supported on support members 23 which extend above the upper wing surface 24', as shown in Figure 3. Pivoted to the bell crank arms 19 at 24 are flap operating arms 25 which are slightly bent, as indicated at 26, to permit of their operation within the confined space provided.

Pivoted to pivots 27 on the supports 23 above mentioned are links 28 whose other ends are pivoted to pivots 29 in the front part of the support members 13. The pivots 29 comprise stub shafts which pass from one of the supports 13 to the other, being journaled in the upwardly extending parts 14 of the supports 13.

The flap operating arms 25 are pivoted at their other ends 31 to pivots 32 which are supported between crank arms 33 attached to a shaft 34. The shaft 34 is provided with a worm wheel 35 engaging a worm 36 on an operating shaft 37 which has a beveled gear 38 engaging another beveled gear 39 which is mounted on a shaft 41 driven by a crank handle 42.

By rotating the crank handle 42 the shaft 41 is rotated to rotate the beveled gear 38 which rotates beveled gear 39 and shaft 37. The rotation of shaft 37 is transmitted through the worm 36 to the worm wheel 35 to rotate the shaft 34. This moves the aileron operating rods 25 either forwardly or rearwardly.

When the aileron rods 25 are pulled forwardly through the bell crank levers 18, the flaps are pulled backwardly and shoved downwardly. The links 28 and the bell cranks 18 are so proportioned that the front edge of the flaps shall remain substantially level with the lower wing surface. The trailing edges of the flaps lie substantially within the locus of perpendiculars drawn to the datum lines of the wing sections which pass through the trailing edge of the wings.

This construction is light and sturdy, and gives the desirable operative characteristics of the flap. In the fully extended position of the flap the parts assume the position shown in dotted lines in Figure 3.

The ailerons 6 pivot on pivots 43 supported by the aileron horns 7. The aileron horns 7, as before described, have a forwardly extending upper surface 8, and are streamlined as indicated, see Figure 1 particularly. The space afforded by this forwardly projected portion of the aileron horns 7 permits space for the operation of the links and bell crank connections previously described.

Figure 9:
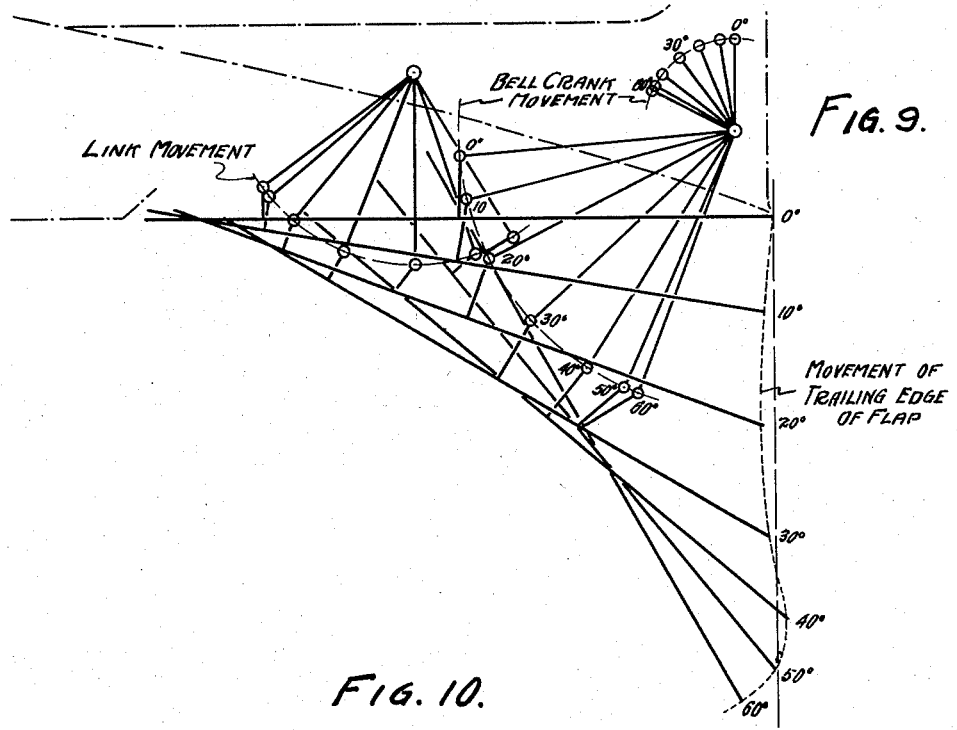
Fig. 9 is a graph showing the geometrical relationship of the parts and of the flap in the type of mechanism illustrated in Figures 1 to 5 inclusive.

The movement of the trailing edge of the flap in the form of invention just described, namely that shown in Figures 1, 2, 3, 4, and 5, is graphically depicted in Figure 9, where the bell crank movement, the link movement and the movement of the trailing edge of the flap is plainly indicated, the position of the trailing edge of the flap being indicated in terms of angular movement of the bell crank lever. It will be seen that the trailing edge of the flap lies substantially within the locus of perpendiculars drawn to the datum lines of the wing sections which pass through the trailing edge of the wing. Another way of saying this is that the trailing edge of the flap shall lie substantially directly below the trailing edge of the wing in all of its extended and retracted positions.

In Figure 6 I have shown another form of bell crank movement for operating the flaps. Here there are bell cranks 44 having upwardly extending arms 45 and arms 46 with bracing members 47. The bell cranks 44 are pivoted on pivots 48 on flanged support members 49 carried within the wing but projecting beyond the upper wing surfaces, indicated clearly in Figure 6. The upwardly extending arms 45 of the bell cranks 44 are pivoted at 51 to flap operating rods 52 which do not have to be bent as were the flap operating rods 25. The flap operating rods 52 are pivoted at 53 to the crank arms 33 previously described.

The flanged support members 49 are riveted at 54 to flanges 55 on flanged support members 56 which are attached by bolts 57 to a rear wing spar 58. The shaft 34 is journaled at 59 in the upwardly projecting flanges of flanged supports 56 and the crank arms 33 are adapted to rotate between the upstanding flanges of the flanged supports 56. The flanged supports 56 are provided with slots 61, indicated in dotted lines in Figure 6. The slots 61 are cut, in Figure 7, to show the lower part of the slot which is formed by cutting an aperture in the supports 56 and bending out the edges as indicated in Figure 7.

Adapted to travel in the slots 61 are rollers or slide members 62 which are carried on upstanding flanges 63 of flanged support members 64, which are attached to the upper corrugated elements of the wing flaps. The crank arms 46 of the bell cranks 44 are pivoted at 65 in the upstanding flanges of the flanged support members 64.

As in the case of all of the forms shown, the bell crank members and operating rods may be hollow so as to lighten the construction.

In the form shown in Figure 6, when the flap operating rod 52 is pulled forwardly through rotation of the shaft 34 in a counterclockwise direction, looking at the mechanism from the direction in which the view in Figure 6 is taken, the flap is extended, as shown in dotted lines. The front edge of the flap is retained approximately in the plane of the lower surface of the wing and slides forwardly on rollers or slide members 62 in the tracks 61. The bell crank connection extends the tip of the flap downwardly so that it shall lie approximately in the locus of perpendiculars drawn to the datum lines of the wing sections which pass through the trailing edge of the wing. The mechanism described lies within the streamlined supporting horn construction described in connection with Figure 3.

Figure 10:
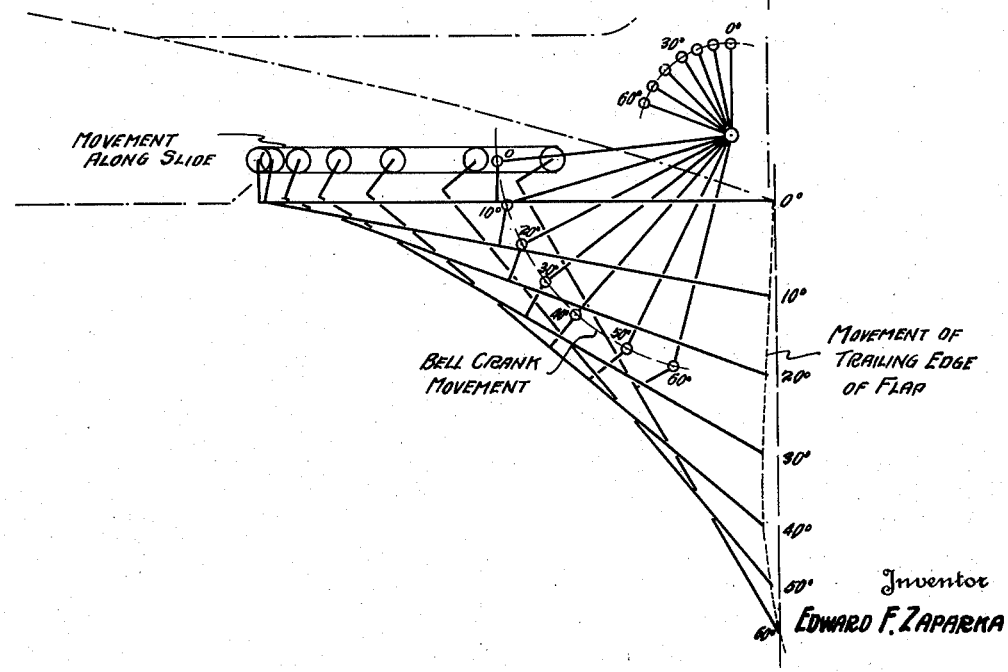
Fig. 10 is a graph similar to that shown in Figure 9, but illustrative of the geometrical relationship of the parts in the type of flap illustrated in Figures 6 and 7.

Referring to Figure 9 I have shown diagrammatically the positions occupied by the trailing edge of the flap with respect to angular movement in the form of device shown in Figures 1 to 5, inclusive, and likewise I have shown the movement of the trailing edge of the flap in the form depicted in Figures 6 and 7 in Figure 10. It will be noticed that the length of linkages and other factors can be regulated so that the trailing edge of the flap in the positions of extension and retraction lies in the defined locus which is the optimum position for the trailing edge of the flap.

In Figure 8 I have shown somewhat schematically another type of linkage for the extension of the flap. Here there is a flap operating rod 66 which I have shown in dotted lines, which is pivoted to the crank arms 33 of the shaft 34 at 67. The other end of the flap operating rod is pivoted at 68 to supports 69 attached to the upper surface of the flap 10. Attached to the upper surface of the flap 10, at 71, is a link 72 which is pivoted at 73 in the streamlined housing which comprises the aileron horn 7. Pivoted at a considerable distance from the flap and on the lower surface of the wing, as indicated at 74, is a link 75 which is pivoted near the rear of the flap, as indicated at 76, to the under surface of the flap. On rotating the shaft 34 in a counterclockwise direction, looking at the parts from the direction in which the view in Figure 8 is taken, the flap will be extended, as indicated in dotted lines, and the link 72 will occupy its rear dotted line position, while the link 75 will assume its dotted line position. The position of the flap fully extended is indicated in dotted lines.

In this form the flap in its extended positions tends to have its trailing edge occupy the defined locus or optimum position for the flap, but the approximation to a theoretically perfect position is not as close as in the other forms shown. Parts are duplicated to give desired support.

The type of aileron used is that described in my co-pending applications Serial Nos. 653,918 and 657,134. Here the aileron is located within the downflow over the wing. It is to be appreciated, of course, that I am not bound to the utilization of this particular type of aileron except as I may impose specific limitations in some of the claims.

I claim:

1. An airplane construction comprising an aileron, mounting means for the aileron above the wing, a flap, and means for operating the flap located at least partially within the mounting means for the aileron.

2. An airplane construction comprising wings having downflow thereover, ailerons operating at least partially in the downflow, mounting means above the wings having recesses therein for mounting the ailerons, flaps, and means for operating the flaps located at least partially within the mounting means for the ailerons.

3. An airplane construction comprising a wing, an aileron, mounting means for the aileron above the upper wing surface, a flap adapted in positions of extension and retraction to have its trailing edge approximately directly below the trailing edge of the wing, and means for operating the flap located at least partially within the mounting means for the aileron.

4. An airplane construction comprising wings having downflow thereover, ailerons operating at least partially in the downflow, mounting means above the wings having recesses therein for mounting the ailerons, flaps whose trailing edges in positions of extension and retraction are adapted to lie substantially within the locus of perpendiculars drawn to the datum line of the wing sections and passing through the trailing edge of the wings, and means for operating the flaps located at least partially within the mounting means for the ailerons.

5. An airplane construction comprising wings, flaps for each wing, an operating shaft, means to rotate the operating shaft, crank arms carried by the operating shaft, flap operating arms adapted to be reciprocated by the crank arms, ailerons operating at least partially in the downflow over the wings, mounting means for the ailerons above the wings and having recesses therein, bell crank levers having one of their arms attached to the flaps and the other of their arms attached to the flap operating arms to move the flaps, a portion of the bell crank levers lying within the mounting means for the ailerons.

6. An airplane construction comprising wings, flaps for each wing, an operating shaft, means to rotate the operating shaft, crank arms carried by the operating shaft, flap operating arms adapted to be reciprocated by the crank arms, ailerons operating at least partially in the downflow over the wings, mounting means for the ailerons above the wings and having recesses therein, bell crank levers having one of their arms attached to the flaps and the other of their arms attached to the flap operating arms to move the flaps, a portion of the bell crank levers lying within the mounting means for the ailerons, and links pivoted to the flaps in front of the point of attachment of the bell cranks to the flaps.

7. A flap operating mechanism comprising a wing, a slide in the wing, a flap, means mounted on the flap and projecting into the slide, an aileron, an aileron support located above the wing, a bell crank lever having one arm attached to the flap rearwardly of the first named means, said bell crank lying at least in part within the aileron support, and means to operate the bell crank lever.

8. A flap operating mechanism comprising a wing, a slide in the wing, a flap whose trailing edge in operative positions is adapted to lie approximately directly below the trailing edge of the wing, means mounted on the flap and projecting into the slide, an aileron, an aileron support located above the wing, a bell crank lever having one arm attached to the flap rearwardly of the first named means, said bell crank lying at least in part within the aileron support, and means to operate the bell crank lever.

9. A flap operating mechanism comprising a wing, a slide in the wing, a flap in operative position adapted to have its trailing edge lie substantially within the locus of lines drawn perpendicular to the datum line of the wing section and passing through the trailing edge of the wing, means mounted on the flap and projecting into the slide, an aileron, an aileron support located above the wing, a bell crank lever having one arm attached to the flap rearwardly of the first named means, said bell crank lying at least in part within the aileron support, and means to operate the bell crank lever.

10. A flap operating mechanism comprising a wing, a slide in the wing, a flap, means mounted on the flap and projecting into the slide, an aileron, an aileron support located above the wing, a bell crank lever having one arm attached to the flap rearwardly of the first named means, a bracing member attached to the bell crank lever, said bell crank lying at least in part within the aileron support, and means to operate the bell crank lever.

11. A flap operating mechanism comprising a wing, a slide in the wing, a flap in operative position adapted to have its trailing edge lie substantially within the locus of lines drawn perpendicular to the datum line of the wing section and passing through the trailing edge of the wing, means mounted on the flap and projecting into the slide, an aileron, an aileron support located above the wing, a bell crank lever having one arm attached to the flap rearwardly of the first named means, a bracing member attached to the bell crank lever, said bell crank lying at least in part within the aileron support, and means to operate the bell crank lever.

12. In a flap operating mechanism, a wing, a trailing edge flap, links pivoted beneath the wing and above the flap upon which the flap is mounted for downward and rearward movement, one of said links being pivoted to the flap at a position forward of the pivot point of the other link to the flap, said front link being sufficiently shorter than the rear link so that the trailing edge of the flap moves downward in a substantially straight line.

13. In a flap operating mechanism, a wing, a trailing edge flap, links of different lengths pivoted beneath the wing and above the flap upon which the flap is mounted for rearward and downward movement, the shorter of said links being pivoted to the flap in a position forward of the pivot point of the longer link, said links so proportioned that the trailing edge of the flap moves downward in a substantially straight line.

14. In a flap operating mechanism, a wing, a trailing edge flap, links pivoted beneath the wing and above the flap upon which the flap is mounted for rearward and downward movement, one of said links being pivoted to the flap at a position forward of the pivot point of the other link to the flap, said pivot points of the links to the flap being located on the top of the flap, said front link being sufficiently shorter than the rear link so that the trailing edge of the flap moves downward in a substantially straight line.

15. In a flap operating mechanism, a wing, a trailing edge flap, links of different lengths pivoted beneath the wing and above the flap upon which the flap is mounted for rearward and downward movement, the shorter of said links being pivoted to the flap in a position forward of the pivot point of the longer link, said pivot points of the links to the flap being located on the top of the link, said links so proportioned that the trailing edge of the flap moves downward in a substantially straight line.

16. In a wing, an undersurface flap positioned rearwardly of the center of the chord, links connecting the flap with said wing, the upper ends of the links being within the confines of the wing and out of the air stream, one of said links being pivoted to the wing and to the flap at points forward of the pivot point of the other link to the wing and the flap and the rear link being longer than the front link whereby the flap is mounted for rearward and downward movement, and means to operate the flap moving mechanism, said links being so proportioned that the trailing edge of the flap moves downward in a substantially straight line.

17. In a flap operating mechanism, a wing, a flap mounted at the lower rear side of the wing, a bell crank lever supported by the wing, a flap operating arm pivoted to one arm of the bell crank, the other arm of the bell crank being pivoted to the flap, and a link supported by the wing at one end and pivoted to the flap at the other, said link being sufficiently shorter than the arm of the bell crank connected to the flap so that the trailing edge of the flap moves downward in a substantially straight line.

18. In a wing, an undersurface flap positioned rearwardly of the center of the chord, links connecting the flap with said wing, one of the links being pivoted to the wing and to the flap at points forward of the pivot point of the other link to the wing and the flap and the rear link being longer than the front link whereby the flap is mounted for rearward and downward movement and means to operate the flap moving mechanism, said links being so proportioned that the trailing edge of the flap moves downward in a substantially straight line.

EDWARD F. ZAPARKA.